United States Patent
Guo et al.

(10) Patent No.: US 7,631,202 B2
(45) Date of Patent: Dec. 8, 2009

(54) POWER MANAGEMENT OF WIRELESS LOCAL AREA NETWORK INTERFACE DEVICES

(75) Inventors: Zihua Guo, Beijing (CN); Richard Yuqi Yao, Morris Plains, NJ (US); Abhishek Abhishek, Woodinville, WA (US); Shipeng Li, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 521 days.

(21) Appl. No.: 11/091,958

(22) Filed: Mar. 29, 2005

(65) Prior Publication Data

US 2006/0242328 A1    Oct. 26, 2006

(51) Int. Cl.
*G06F 1/00* (2006.01)
(52) U.S. Cl. .................................................. 713/310
(58) Field of Classification Search .............. 713/310; 370/311
See application file for complete search history.

(56) References Cited

U.S. PATENT DOCUMENTS

| 6,614,768 | B1 |  | 9/2003 | Mahany |
| 6,829,493 | B1 |  | 12/2004 | Huninger |
| 6,904,102 | B2 | * | 6/2005 | Porcino ................ 375/316 |
| 7,318,128 | B1 | * | 1/2008 | Dice ..................... 711/151 |
| 2001/0022790 | A1 |  | 9/2001 | Porcino |
| 2003/0103487 | A1 | * | 6/2003 | Kim et al. ............. 370/350 |
| 2003/0185170 | A1 | * | 10/2003 | Allen et al. ........... 370/329 |
| 2004/0184473 | A1 | * | 9/2004 | Tavli et al. ............ 370/445 |
| 2004/0184477 | A1 | * | 9/2004 | Tavli et al. ............ 370/461 |
| 2004/0228275 | A1 |  | 11/2004 | Costo |

(Continued)

FOREIGN PATENT DOCUMENTS

EP    0711089    5/1996

(Continued)

OTHER PUBLICATIONS

In the United States Patent and Trademark Office, Notice of Non-Compliant Information Disclosure Statement, in re:. U.S. Appl. No. 11/091,958 filed Mar 29, 2005, Dated Apr. 15, 2009, 1 page.

*Primary Examiner*—Thomas Lee
*Assistant Examiner*—Mohammed H Rehman
(74) *Attorney, Agent, or Firm*—Woodcock Washburn LLP

(57) ABSTRACT

Computer-implemented methods for power management of network interface devices are disclosed. Such methods may include dividing a time period into a plurality of time slots, determining an amount of data received by the network interface device during a first of the time slots, and determining whether the amount of data received exceeds a predefined threshold. If the amount of data received exceeds the predefined threshold, then the network interface device is caused to be awake during a subsequent time slot. The network interface device is caused to go to sleep during the subsequent time slot unless the amount of data received exceeds the predefined threshold. A number of the time slots may be defined as wakeup time slots during which the network interface device is awake. The number of time slots during the time period in which one or more packets were received by the network interface device may be compared to the number of wakeup time slots during the time period. Based on the comparison, the number of wakeup time slots may be adjusted for a subsequent time period.

19 Claims, 3 Drawing Sheets

U.S. PATENT DOCUMENTS

| | | | |
|---|---|---|---|
| 2004/0255008 A1* | 12/2004 | Olsen et al. | 709/220 |
| 2005/0002414 A1 | 1/2005 | Miyaoka | |
| 2006/0153150 A1* | 7/2006 | Yang et al. | 370/338 |
| 2006/0187864 A1* | 8/2006 | Wang et al. | 370/311 |
| 2006/0198305 A1* | 9/2006 | Hamdi | 370/232 |
| 2007/0086471 A1* | 4/2007 | Igarashi et al. | 370/412 |

FOREIGN PATENT DOCUMENTS

| | | |
|---|---|---|
| EP | 1294206 | 3/2003 |
| EP | 1311086 | 5/2003 |
| EP | 1317098 | 6/2003 |
| WO | WO 2004095193 | 11/2004 |

* cited by examiner

POWER MANAGEMENT OF WIRELESS LOCAL AREA NETWORK INTERFACE DEVICES

FIELD OF THE INVENTION

The invention relates to power management algorithms for IEEE 802.11 wireless local area network ("WLAN") network interface devices (NIDs), such as network interface cards (NICs) and network interface modems (NIMs).

BACKGROUND OF THE INVENTION

Typical IEEE 802.11-based WLAN NIDs have two power modes—a "constant active mode" (CAM), in which the device is always "awake," and a standard-defined "power saving mode" (PSM), in which the device is "asleep" most of the time and awakens periodically, e.g., every 100 ms.

In the CAM, application performance, in terms of packet throughput and latency, for example, may be very good. Because the NID is always awake, however, power consumption in CAM tends to be very high. In the PSM, power consumption is much lower, but at the cost of performance because data that arrives while the NID is asleep tends to be delayed. Because the NID is awake only periodically, there is no correlation, generally speaking, between the times at which the NID is awake, and the times at which data is being delivered through the NID. Consequently, though the PSM may provide power savings, it is well known that this kind of operation affects the downlink application's performance significantly and tends to degrade quality of service (QoS). It would be desirable, however, to be able to save as much power as possible while maintaining acceptable performance, i.e., to be able to optimize the tradeoff between power and performance.

Smart power management, where the operating system awakens the NID based on some intelligence about when data is to be received, is relatively easy for typical uplink applications because round trip time (RTT) information may be known for each packet. Consequently, the operating system knows the packet arrival times, and, accordingly, when to awaken the NID to receive data.

In typical IEEE 802.11-based WiFi systems, however, downlink applications, such as web browsing, FTP, and video streaming, for example, are dominant. Unfortunately, for typical downlink applications, the RTT may be unknown, and smart power management systems that work for uplink applications might not work well for downlink applications. It would be advantageous, therefore, if there were available systems and methods for smart power management that strike a desired balance between power savings and performance for downlink applications.

SUMMARY OF THE INVENTION

The invention provides a smart power management scheme with significant power savings and good application performance. More specifically, a method according to the invention may provide the capability for the NID to "wake up" and "sleep" adaptively. It can capture the traffic arrival patterns so that the application performance will not be affected, while its power reduction is comparable to the current PSM.

In an 802.11 system, a "beacon" will occur once every "beacon period." The NID may awaken at least once every "beacon listen interval" (BLI), which may be an integer times the beacon period. Each BLI may be divided into time slots. In each time slot, the NID may be commanded to sleep or awaken. A slot in which the NID is awake may be referred to as a "wakeup slot."

Initially, the NID is expected to be in its active mode. Accordingly, every time slot may be a wakeup slot. During a BLI, the amount of data received during each wakeup slot is determined. If the system determines that amount of data received exceeds a certain threshold, then the NID is kept awake for the subsequent time slot. Otherwise, the NID is put to sleep for the subsequent time slot.

After each BLI, the number of wakeup slots is adapted for the next BLI based on information learned during the previous BLI. A ratio may be computed of the number of time slots during the previous BLI in which one or more packets were received, to the total number of wakeup slots in the previous BLI. If the system determines that the ratio is less than a first threshold, then the number of wakeup slots may be decreased for the next BLI. If the system determines that the ratio exceeds a second threshold, then the number of wakeup slots may be increased for the next BLI. Otherwise, the number of wakeup slots remains the same for the next BLI.

Such a method may be implemented on the kernel side of an operating system driver that communicates with a wireless LAN card or modem using API that delivers SLEEP and WAKE commands to the NID that cause the NID to sleep and wake accordingly.

DETAILED DESCRIPTION OF ILLUSTRATIVE EMBODIMENTS

Example Computing Environment

Figure 1:
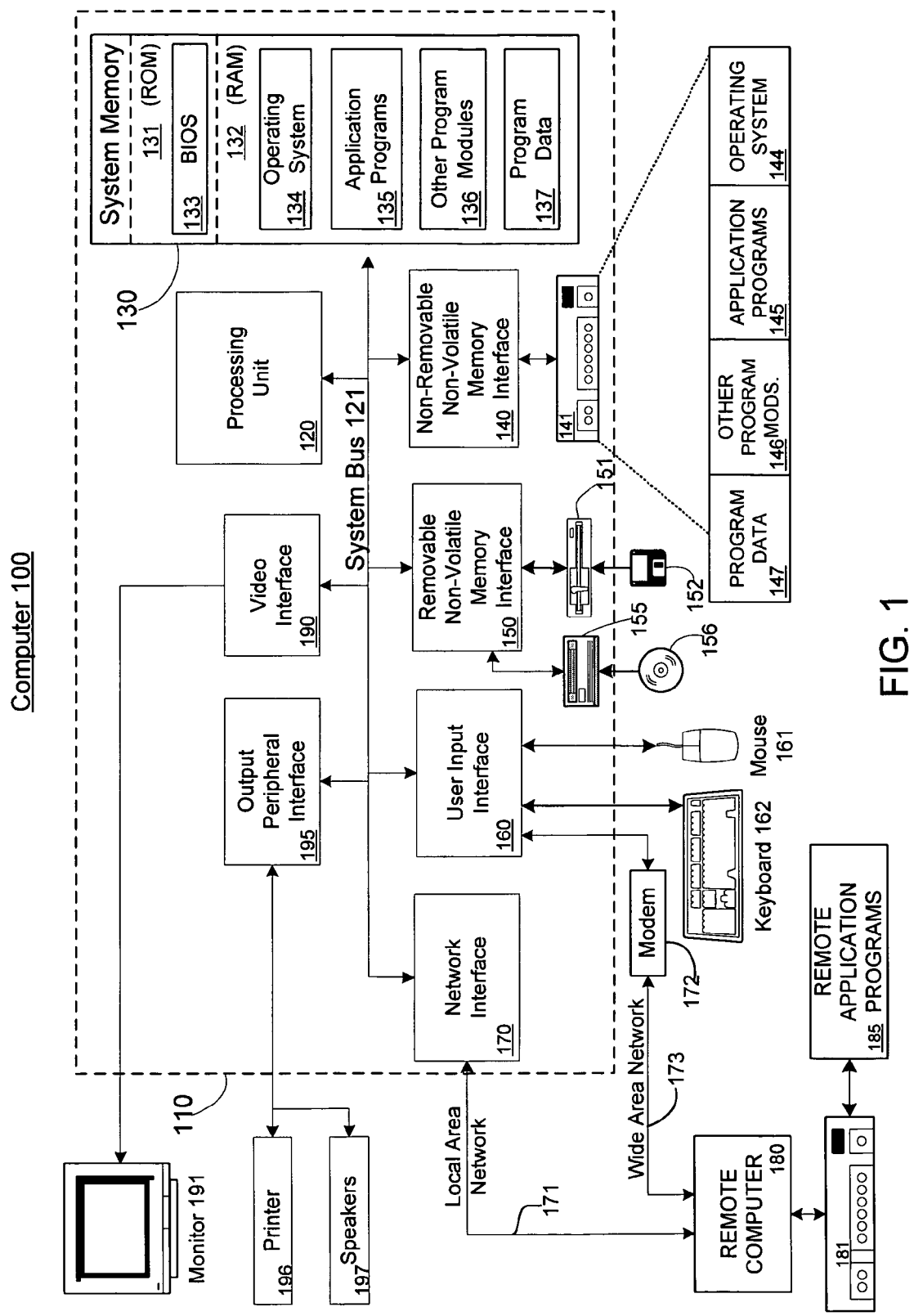
FIG. 1 is a block diagram showing an example computing environment in which aspects of the invention may be implemented.

FIG. 1 and the following discussion are intended to provide a brief general description of a suitable computing environment in which an example embodiment of the invention may be implemented. It should be understood, however, that handheld, portable, and other computing devices of all kinds are contemplated for use in connection with the present invention. While a general purpose computer is described below, this is but one example. The present invention also may be operable on a thin client having network server interoperability and interaction. Thus, an example embodiment of the invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer or tester, and/or included within the network browsing software which will be described in the general context of computer-executable instructions, such as program modules, being executed by one or more computers (e.g., client workstations, servers, or other devices). Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, minicomputers, mainframe computers, and the like. An embodiment of the invention may also be practiced in distributed computing environments where tasks are performed by remote processing devices that are linked through a communications network or other data transmission medium. In a distributed computing environment, program modules may be located in both local and remote computer storage media including memory storage devices.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an example system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, random access memory (RAM), read-only memory (ROM), Electrically-Erasable Programmable Read-Only Memory (EEPROM), flash memory or other memory technology, compact disc read-only memory (CDROM), digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above should also be included within the scope of computer readable media.

The system memory 130 includes computer storage media in the form of volatile and/or nonvolatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137. RAM 132 may contain other data and/or program modules.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120*a-f* through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

One of ordinary skill in the art can appreciate that a computer 110 or other client devices can be deployed as part of a computer network. In this regard, the present invention pertains to any computer system having any number of memory or storage units, and any number of applications and processes occurring across any number of storage units or volumes. An embodiment of the present invention may apply to an environment with server computers and client computers deployed in a network environment, having remote or local storage. The present invention may also apply to a standalone computing device, having programming language functionality, interpretation and execution capabilities.

Smart Power Management in WLAN NIDs

Figure 2A:
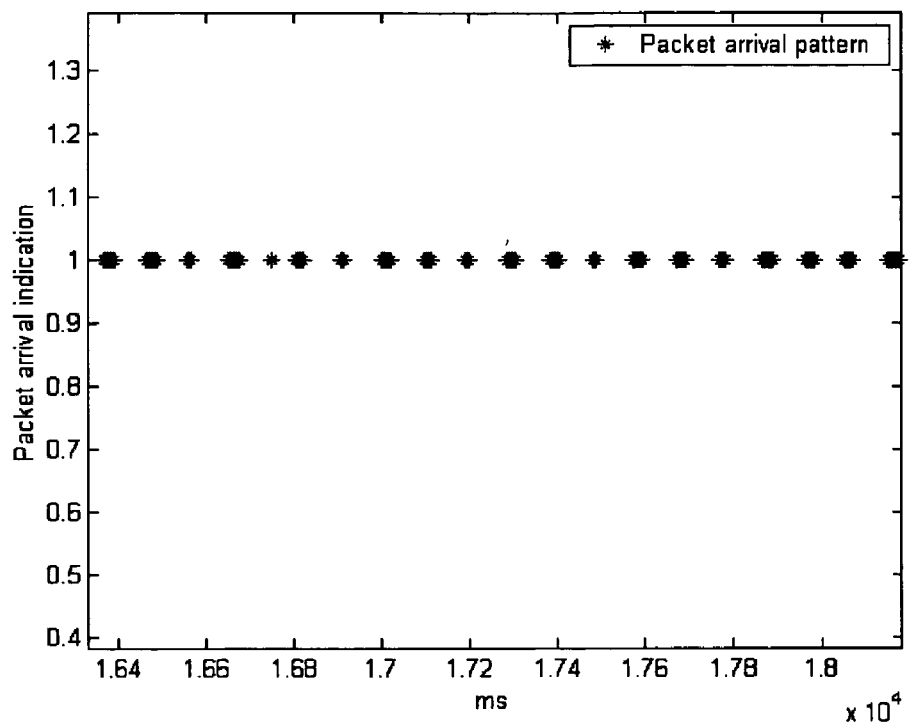
FIGS. 2A and 2B depict steady-state TCP traffic patterns for FTP and video streaming, respectively.
Figure 2B:
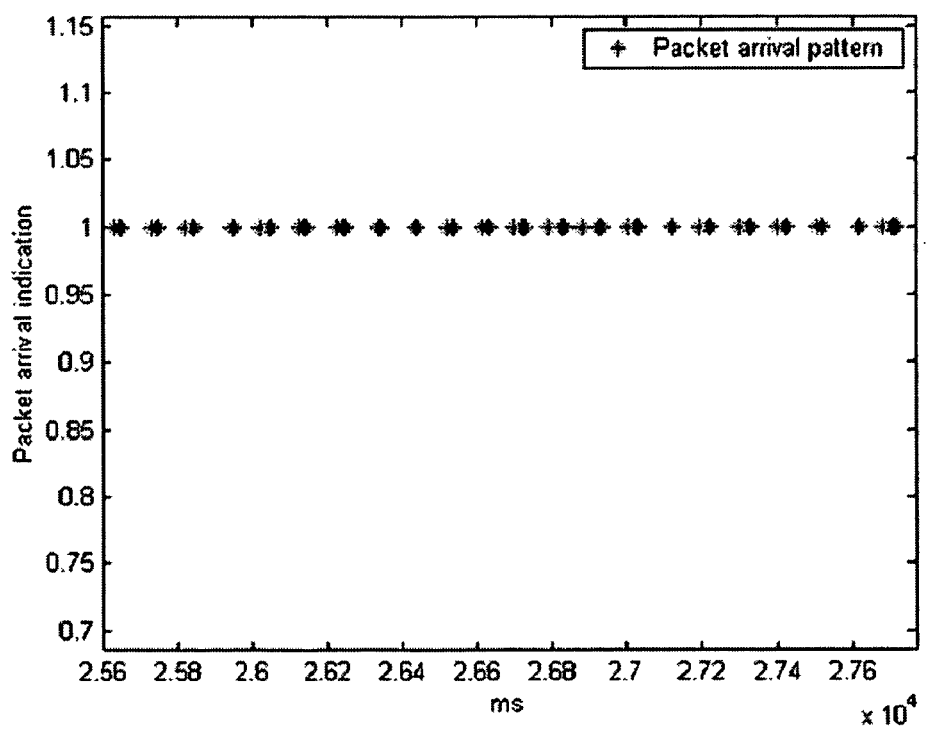

The inventors have observed certain behaviors in the traffic patterns in downlink transmission control protocol (TCP) and user datagram protocol (UDP) traffic-based applications. FIGS. 2A and 2B depict steady-state TCP traffic patterns for file transfer protocol (FTP) and video streaming, respectively. It can be seen that the traffic is rather bursty (i.e., the data arrives in bursts), and that the burst arrival interval (i.e., the amount of time between successive arrivals of data bursts) is a relatively stable during the period of a few seconds. The inventors have discovered that this behavior can be utilized to try to capture the traffic arrival pattern so that sleep pattern of the NID (i.e., when the NID is asleep and when the NID is awake) can be controlled in a smart way without causing any significant delay in packet transfer.

Figure 3:
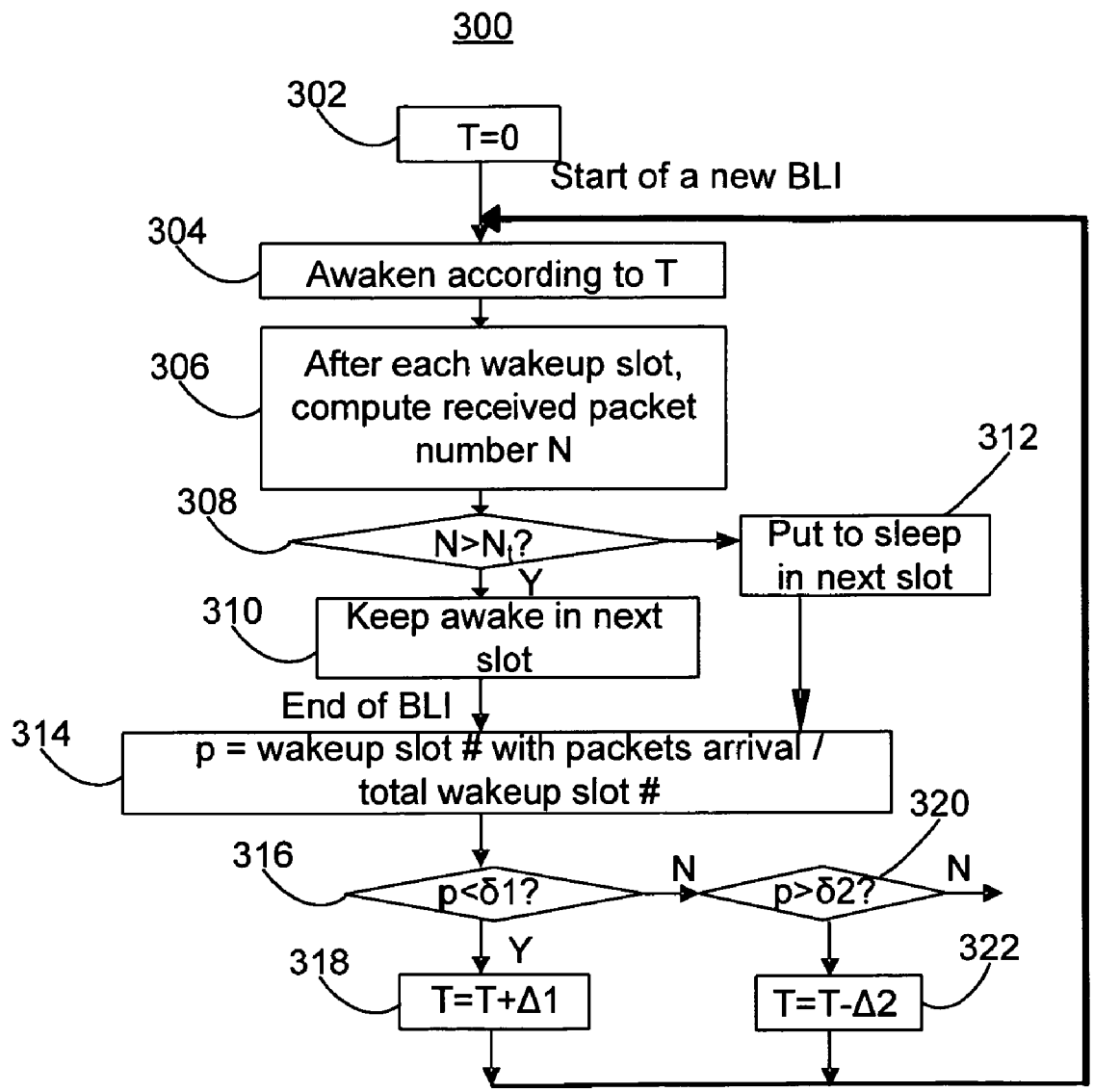
FIG. 3 is a flowchart of an example embodiment of a method according to the invention for providing smart power management in WLAN NIDs.

FIG. 3 is a flowchart of an example embodiment of a method 300 according to the invention for providing smart power management in WLAN NIDs. Such a method may be performed as an operating system function, and may be implemented in hardware or software. Such implementation may include computer-executable instructions stored on a computer-readable medium. In particular, such a method may be implemented on the kernel side of an operating system driver that communicates with a wireless LAN card or modem. Current cards have API that accepts idle time, and then commands the card to wake every idle time. A method according to the invention could be implemented using API that delivers SLEEP and WAKE commands to the NID, causing the NID to sleep and wake accordingly.

It should be understood that, in an 802.11 system, a beacon will occur once every beacon period (e.g., 100 ms). The NID may awaken at every beacon listen interval ("BLI"), which may be an integer times the beacon period. In an example embodiment of the invention, time may be divided into time slots. Each time slot may have duration of between about 10 ms and about 15 ms, for example. In each time slot, the NID may be commanded to sleep or awaken. Whether the NID is to sleep or awaken in a given time slot is determined by the following algorithm. The BLI may be treated as a processing period, and the first and last slots in the BLI may always be "wakeup" slots.

Let T be defined as the sleep interval (i.e., the number slots through which the NID is to sleep). Accordingly, the NID may be awakened every T+1 slots. Initially, (e.g., at power on) the NID is expected to be in its active mode. Accordingly, at step 302, the sleep interval T may be set to zero (so that the NID is awake during every slot).

During a BLI, the NID is awakened, if necessary, at step 304, according to T. At step 306, the number (or length) N of the packets received during each wakeup slot is determined. If, at step 308, the system determines that $N > N_t$, where $N_t$ is a predefined threshold, then, at step 310, the NED is kept awake for the subsequent (i.e., next) time slot. Otherwise, at step 312, the NID is put to sleep for the subsequent time slot.

After each BLI, the value of T is adapted based on information learned during the previous BLI. First, at step 314, a ratio p may be computed of the number of time slots during the previous BLI in which one or more packets were received, to the total number of wakeup slots in the previous BLI. If, at step 316, the system determines that the ratio p is less than a first threshold $\delta 1$, then, at step 318, T may be increased by an amount $\Delta 1$ for the next BLI. If, at step 210, the system determines that the ratio p is greater than a second threshold $\delta 2$, then, at step 322, T may be decreased by an amount $\Delta 2$ for the next BLI. Otherwise, T remains the same for the next BLI. The value of T may be constrained between zero (i. e., where the NID is always awake) and one less than the number of time slots in the BLI (i.e., so that the NID is awake for at least one time slot every BLI). The process 300 then repeats indefinitely for subsequent BLIs.

It should be noted that adjustments to T may be nonlinear. For example, suppose that the thresholds $\delta 1$ and $\delta 2$ are chosen so that the number of regular wakeup times in the next BLI is adjusted (i.e., increased or decreased) by one. Suppose further that the BLI is 30 time slots long and T currently equals five. The number of wakeup time slots in a BLI may be computed as ceil(BLI/(T+1)), where the function ceil(x) rounds x up to the next nearest integer. Accordingly, for BLI=30 and T=5, the number of wakeup time slots in the BLI is ceil(30/(5+1))=5.

To decrease the number of wakeup time slots to four, T should be increased to be either seven or eight because ceil (30/(7+1))=4 and ceil(30/(8+1))=4. On the other hand, to increase the number of wakeup time slots to six, T should be decreased to four, because ceil(30/(4+1))=6. Thus, as shown in this example, to increase by one the number of wakeup time slots in a BLI, the value of T may be decreased by one. On the other hand, to decrease by one the number of wakeup time slots in a BLI, the value of T may be increased by more than one. Generally speaking, the amount by which T is to be increased, if it is to be increased, need not be the same as the amount by which T is to be decreased, if it is to be decreased.

Thus, there have been described systems and methods for managing power in WLAN network interface devices. It should be understood that the invention has been described herein with respect to certain example embodiments, and that other embodiments of the invention may fall within the scope of the following claims.

What is claimed:

1. A computer-implemented method for power management of a network interface device, the method comprising:
   dividing a time period into a plurality of time slots;
   determining an amount of data received by the network interface device during a first of the time slots;
   determining whether the amount of data received exceeds a predefined threshold; and
   if the amount of data received exceeds the predefined threshold, then causing the network interface device to be awake during a subsequent time slot,
   computing a ratio of the number of time slots during the time period in which one or more packets were received by the network interface device to the number of wakeup time slots during the time period,
   and, based on the comparison of the ratio to a first threshold, adjusting a number of wakeup time slots during which data is received by the network interface device for a subsequent time period.

2. The method of claim 1, further comprising:
   causing the network interface device to go to sleep during the subsequent time slot unless the amount of data received exceeds the predefined threshold.

3. The method of claim 2, wherein the time period corresponds to a beacon listen interval.

4. The method of claim 3, further comprising:
   causing the network interface device to be awake during at least one time slot during the beacon listen interval.

5. The method of claim 4, further comprising:
   causing the network interface device to be awake during at least one time slot during a subsequent beacon listen interval.

6. The method of claim 1, wherein the network interface device is a network interface card.

7. The method of claim 1, wherein the network interface device is a network interface modem.

8. The method of claim 1, wherein the network interface device complies with IEEE standard 802.11.

9. A computer-implemented method for power management of a network interface device, the method comprising:
   dividing a time period into a plurality of time slots, wherein a number of the time slots are wakeup time slots during which the network interface device is awake;
   determining a number of time slots during the time period in which one or more packets were received by the network interface device;
   computing a ratio of the number of time slots during the time period in which one or more packets were received by the network interface device to the number of wakeup time slots during the time period;
   comparing the number of time slots during the time period in which one or more packets were received by the network interface device to the number of wakeup time slots during the time period; and
   based on the comparison of the ratio to a first threshold, determining whether to adjust the number of wakeup time slots during which data is received by the network interface device for a subsequent time period.

10. The method of claim 9, wherein adjusting the number of time slots comprises decreasing the number of time slots during which data is received by the network interface device for the subsequent time period if the ratio is less than the first threshold.

11. The method of claim 10, wherein adjusting the number of time slots comprises increasing the number of time slots during which data is received by the network interface device for the subsequent time period if the ratio is more than the first threshold.

12. The method of claim 9, wherein adjusting the number of time slots comprises increasing the number of time slots during which data is received by the network interface device for the subsequent time period if the ratio is more than the first threshold.

13. The method of claim 9, wherein the network interface device is a network interface card.

14. The method of claim 9, wherein the network interface device is a network interface modem.

15. The method of claim 9, wherein the network interface device complies with IEEE standard 802.11.

16. A computer-implemented method for power management of a network interface device, the method comprising:
   dividing a time period into a plurality of time slots, wherein the network interface device is caused to be asleep during a first number of the plurality of time slots;
   determining a second number of time slots during the time period in which data was received by the network interface device;
   increasing the first number of time slots, for a subsequent time period, by an incremental number of time slots if the second number is less than a first threshold; and
   decreasing the first number of time slots, for the subsequent time period, by a decremental number of time slots if the second number exceeds a second threshold, wherein the decremental number of time slots is different from the incremental number of time slots.

17. The method of claim 16, further comprising:
   computing at least one of the incremental number and the decremental number as based on an integer function of the number of time slots in the time period and a number of time slots during the time period during which the network interface device is asleep.

18. The method of claim 17, wherein the function includes rounding at least one of the incremental number and the decremental number to a next nearest integer.

19. The method of claim 17, wherein the function includes rounding a computed number of wakeup time slots up to a next nearest integer.

* * * * *